United States Patent
Drobe et al.

(10) Patent No.: US 8,573,778 B2
(45) Date of Patent: Nov. 5, 2013

(54) PRODUCING A CUSTOMIZED SPECTACLE LENS IN ACCORDANCE WITH A BLURRED PERCEPTION

(75) Inventors: Björn Drobe, Charenton-le-Pont (FR); Guillaume Giraudet, Charenton-le-Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 104 days.

(21) Appl. No.: 13/264,146

(22) PCT Filed: Apr. 12, 2010

(86) PCT No.: PCT/FR2010/050707
§ 371 (c)(1),
(2), (4) Date: Oct. 12, 2011

(87) PCT Pub. No.: WO2010/119218
PCT Pub. Date: Oct. 21, 2010

(65) Prior Publication Data
US 2012/0038889 A1    Feb. 16, 2012

(30) Foreign Application Priority Data

Apr. 14, 2009   (FR) ...................................... 09 52436

(51) Int. Cl.
*A61B 3/00*   (2006.01)
*A61B 3/02*   (2006.01)
*A61B 3/10*   (2006.01)

(52) U.S. Cl.
USPC ............................ 351/246; 351/239; 351/216

(58) Field of Classification Search
USPC .................................. 351/200–246, 169, 177
See application file for complete search history.

(56) References Cited

U.S. PATENT DOCUMENTS

| | | | |
|---|---|---|---|
| 6,318,859 B1 * | 11/2001 | Baudart et al. | 351/159.42 |
| 2004/0015055 A1 | 1/2004 | Metzner | |

(Continued)

FOREIGN PATENT DOCUMENTS

| | | |
|---|---|---|
| EP | 1959294 A2 | 8/2008 |
| WO | 98/52091 A1 | 11/1998 |

(Continued)

OTHER PUBLICATIONS

Ciuffreda et al. ""Bothersome blur": A functional unit of blur perception," *Vision Research* 46:895-901, 2006. 7 Pages, Mar. 2006.

(Continued)

*Primary Examiner* — Mohammed Hasan
(74) *Attorney, Agent, or Firm* — Robert Iannucci; Seed IP Law Group PLLC (57) ABSTRACT

A method for producing an ophthalmic spectacle lens makes it possible to fit out a wearer of lenses in a manner which is customized as a function of a perception of blur by said wearer. The lens is selected so that the wearer has the impression of having a field of sharp vision which has a reference width. This reference width is determined on the basis of a first lens which complies with the wearer's ophthalmic prescription and a reference threshold value of the blur. It is thereafter associated within the lens which is provided for the wearer with a threshold value of the blur which is perceived by this wearer.

16 Claims, 2 Drawing Sheets

(56) References Cited

U.S. PATENT DOCUMENTS

| | | |
|---|---|---|
| 2005/0073648 A1 | 4/2005 | Toshima et al. |
| 2005/0122472 A1 | 6/2005 | Fisher et al. |
| 2006/0146280 A1 | 7/2006 | Gupta et al. |
| 2006/0209255 A1 | 9/2006 | Donetti et al. |
| 2009/0290125 A1 | 11/2009 | Varnas et al. |
| 2009/0310082 A1 | 12/2009 | Varnas |

FOREIGN PATENT DOCUMENTS

| | | |
|---|---|---|
| WO | 99/13374 A1 | 3/1999 |
| WO | 03/048841 A1 | 6/2003 |
| WO | 03/068059 A2 | 8/2003 |
| WO | 2005/091054 A1 | 9/2005 |
| WO | 2006/116820 A1 | 8/2006 |
| WO | 2007/068819 A1 | 6/2007 |
| WO | 2008/031166 A1 | 3/2008 |

OTHER PUBLICATIONS

Ciuffreda et al. "Conceptual model of human blur perception," *Vision Research* 47:1245-52, 2007. 8 Pages, Mar. 2006.

Cufflin et al. "Effect of Blur Adaptation on Blur Sensitivity and Discrimination in Emmetropes and Myopes," *IOVS* 48(6):2932-9, Jun. 2007. 8 Pages.

Schmid et al. "Blur detection thresholds in childhood myopia: single and dual target presentation," *Vision Research* 42:239-47, 2002. 9 Pages, Jan. 2002.

Woods et al. "A Relationship between Tolerance of Blur and Personality," *IOVS* 51(11):6077-82, Nov. 2010. 6 Pages.

\* cited by examiner

PRODUCING A CUSTOMIZED SPECTACLE LENS IN ACCORDANCE WITH A BLURRED PERCEPTION

BACKGROUND

1. Technical Field

The present invention relates to the production of a spectacle lens which is intended for an identified wearer, and which is customized as a function of a perception of blur of this wearer.

2. Description of the Related Art

In a known manner, a difference between the ametropia of a wearer of spectacles and the ophthalmic correction which is afforded by a spectacle lens used by this wearer produces a fuzziness of his vision, called blur. When this blur results from a defocusing of the image behind the retina, it is spontaneously removed by an accommodation of the wearer's eye, to within the accommodation lag and as long as the wearer's limit of ocular accommodation is not exceeded. This results, however, in visual fatigue for the wearer. But in a general manner, outside of the ability for ocular accommodation, the blur which results from a difference between the ametropia of a wearer and the ophthalmic correction of a spectacle lens which is used by the latter constitutes a defect of his vision.

Now, certain spectacle lenses which produce a refined ophthalmic correction also produce some blur for certain oblique directions of gaze, although this blur remains very limited. Such is the case, especially, with progressive lenses which allow a presbyopic wearer to see clearly at variable distances through the determined zones of the lens, but which also exhibit, outside of these zones, variations in optical power and in astigmatism from which the wearer's visual blur originates. Such is also the case with monofocal spectacle lenses which are adapted for simultaneously correcting the wearer's foveal vision and peripheral vision. Progressive or foveal and peripheral correction lenses such as these are then allocated to a given wearer while producing a compromise between the refined optical correction that they afford for principal directions of gaze, and a blur which remains limited for oblique directions of gaze.

But numerous physiological studies have shown that the perception of visual blur varies greatly between different subjects. Thus, two wearers of spectacles who have identical ophthalmic prescriptions and who are fitted with spectacle lenses, likewise identical, may be inconvenienced differently by the blur which is produced by these lenses, for certain oblique directions of their gaze. For example, a first wearer may declare himself to be inconvenienced by this blur, whereas a second wearer may confirm good visual comfort. The compromise which is produced by these identical lenses between their ophthalmic function and the residual blur that they produce is then appropriate for the second wearer, and must be modified for the first.

BRIEF SUMMARY

Thus, an object of the present invention is to produce a spectacle lens which is customized as a function of the perception of the blur by the wearer for whom the lens is intended.

Another object of the invention consists in taking account of the wearer's perception of the blur when the spectacle lens is produced, without increasing a number of different models of lenses that have to be available in stock, and that correspond to one and the same ophthalmic prescription.

Accordingly, the invention proposes a method for producing an ophthalmic spectacle lens which comprises the following steps:

/1/ obtaining characteristics of a series of spectacle lenses which correspond to variable ophthalmic prescriptions and, for each prescription, to at least one distribution of blur values as a function of values of an azimuth of direction of gaze, for at least one fixed reference value of an elevation of the direction of gaze;

/2/ obtaining a reference threshold value of the blur;

/3/ for the identified wearer, obtaining an ophthalmic prescription and at least one threshold value of the blur which is perceived by this wearer;

/4/ from the series of spectacle lenses used in step /1/, selecting a first lens which corresponds to the wearer's ophthalmic prescription;

/5/ for this first lens and for the elevation reference value, determining an azimuth value of the direction of gaze for which the first lens has the reference threshold value of the blur;

/6/ selecting a second lens which also corresponds to the wearer's ophthalmic prescription, and the value of this second lens blur for the elevation reference value and for the azimuth value determined in step /5/ exhibits a discrepancy of equal to or less than 0.50 diopter in absolute value with respect to the perceived-blur threshold value obtained for the wearer in step /3/; and /7/ producing the lens which is intended for the wearer in accordance with the second lens selected in step /6/.

Thus, spectacle lenses which are produced according to the invention for different wearers having identical ophthalmic prescriptions, exhibit fields of sharp vision which have widths which are each adjusted so as to be experienced in one and the same way by the wearers, whatever their respective sensitivities to blur. Consequently, the invention introduces the perception of blur as a parameter for customizing the lens which is provided to each wearer.

The invention therefore makes it possible to provide ophthalmic lenses to different wearers, so that all these wearers have the same impression of benefiting from a vertical central band of vision in which the level of blur is acceptable to each of them. This central band of vision through the spectacle lenses, such as it is perceived by each wearer concerned, possesses a width which is the same. The subjectivity of each wearer's perception of blur is therefore taken into account, in order to carry out a customization of the lens which affords him an impression of width of sharp vision band identical to the impressions which are experienced by other wearers, with their respective lenses.

More precisely, step /5/ of a method according to the invention consists in determining a reference width for a field of sharp vision, that is to say for a field of blur-free vision through the lens provided. Accordingly, the reference threshold value of the blur of step /2/ is used as standard limit of an acceptable quantity of blur. Step /6/ then consists in assigning the limit of perception of the blur which is specific to the wearer considered to the reference width of the field of sharp vision. Stated otherwise, for each lens which is provided to a wearer, the reference threshold value is replaced, at the limits of the reference width of the field of sharp vision, with the blur threshold value which is determined for the wearer of this lens.

The invention does not therefore relate directly to the procedure which is used in step /1/ for determining the distribution of the values of the blur of each lens of the series. The methods known to the person skilled in the art before the invention, for calculating the defect of correction of a lens, and/or the amplitude of the optical aberrations of this lens, for each direction of gaze, may be applied in an equivalent way while all being compatible with the invention. The blur values which are thus determined for each lens, and for directions of gaze through this lens, are objective values, that is to say values which are independent of the future wearer of this lens, as long as the ophthalmic prescription which is associated with the lens corresponds to the wearer's vision.

Likewise, neither does the invention relate particularly to the procedure which is used in step /2/ for determining the reference threshold value of the blur. Any one of the methods known before the present invention for determining a mean maximum level of the blur which is generally accepted or does not, in general, give rise to any visual inconvenience, may be used.

Finally, neither does the invention relate to the methods itself which is used in step /3/ for determining the threshold value of the blur which is specific to each wearer. Likewise, the invention is compatible with all the previously known methods for performing an individual determination such as this, of the blur threshold value, for each wearer.

The invention therefore resides in the implementation of the successive steps /1/ to /7/, according to the sequence described which makes it possible to afford each wearer the sensation of having a width of field of sharp vision, which is the same as that of another wearer.

Furthermore, the spectacle lens which is provided to each wearer, termed the "second lens", may be selected from the same initial series of lenses as the first lens. In this way, the customization of the lens afforded by the invention, as a function of the perception of the blur specific to each wearer, makes it possible to restrict the number of different models of lenses to be stored for one and the same ophthalmic prescription. If the series of lenses used is, for example, a series of semi-finished lenses which correspond to different designs, the customization as a function of the blur which is perceived by each wearer may be carried out by modifying the choice of the lens provided within the same series of semi-finished lenses. In a similar manner, when the lens provided is produced on the basis of previously optimized and recorded designs, the invention may not require the devising of new designs, and the lens which is provided may be selected from among the available designs, or simply calculated on the basis of the latter.

The lenses of the series which is used in step /1/ may be real lenses, especially finished lenses, that is to say having two definitive faces, or else semi-finished lenses, that is to say having a single face which is definitive. They may also be lenses which are defined by records of their respective characteristics. In this case, the invention is implemented on the basis of these recorded characteristics for each of the lenses of the series. The final lens is then produced in step /7/ in accordance with the second recorded lens which was selected in step /6/.

According to a refinement of the invention, the customization of the lens may be carried out by taking account of the perception of the blur by each wearer simultaneously for several elevations of his gaze. Accordingly, the steps of a method according to the invention are supplemented in the following manner:

in step /1/: distributions of values of the blur as a function of the azimuth values are obtained for each lens of the series and for several fixed reference values for the elevation of the direction of gaze;

in step /3/: a threshold value of the blur which is perceived by the identified wearer is obtained for each elevation reference value;

step /5/ is repeated with the same first lens for each elevation reference value, so as to determine an azimuth value which is associated with each elevation reference value and for which the first lens has the reference threshold value of the blur for this elevation reference threshold value; and step /6/ is carried out so that the second lens has values of the blur, for all the elevation reference values used in step /1/ and associated respectively with the corresponding azimuth values determined during the iterations of step /5/, which each exhibit a discrepancy of less than or equal to 0.50 diopter in absolute value with respect to the perceived-blur threshold value obtained in step /3/ for the wearer and for the corresponding elevation reference value.

In this way, the field of the vision which is free of blur for each wearer through the lens which is provided to him, exhibits a width profile which is perceived in a constant manner, whatever this wearer's sensitivity to visual blur.

In practice, one and the same threshold value of the blur which is perceived by the wearer may be used for several elevation reference values, or indeed for all the elevation reference values which are used. Nonetheless, when various elevation reference values are associated with variable distances of vision through the lenses, especially when these lenses are of the progressive lenses type, threshold values for the perceived blur which are variable may be correlated with the variations of the vision distance.

BRIEF DESCRIPTION OF THE SEVERAL VIEWS OF THE DRAWINGS

Other features and advantages of the present invention will be apparent in the description hereinafter of nonlimiting examples of implementation, with reference to the appended drawings, in which.

DETAILED DESCRIPTION

Figure 1:
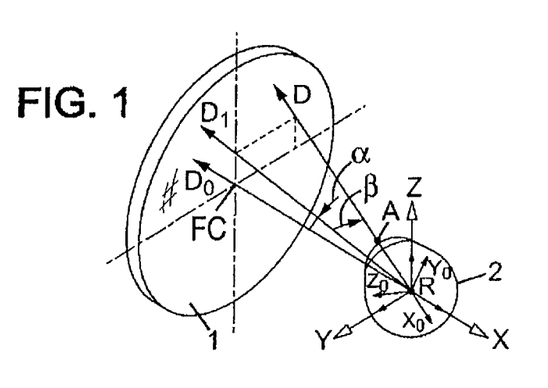
FIG. 1 illustrates a system for labeling the direction of gaze of an ophthalmic lens wearer.

In the present description, and in accordance with FIG. 1, the direction of gaze of a spectacle lens wearer is labeled by two angles, termed elevation and azimuth. Accordingly, a reference direction $D_0$ is adopted, which passes through the center of rotation R of the eye of the wearer and through a mark inscribed on the lens, called a fitting cross and denoted FC. Usually, the fitting cross FC is used to adjust the lens in a housing of a spectacle frame selected by the wearer, so that the wearer's direction of gaze passes through the fitting cross when he looks straight ahead. FIG. 1 represents the spectacle lens, which is referenced 1, in the position of use with respect to the eye of the wearer, referenced 2. The system of axes X, Y, Z is tied to the lens 1, with the center of ocular rotation R as origin. The system of axes $X_0, Y_0, Z_0$ is tied to the eye, so that the wearer's direction of gaze, which is denoted D, at a given instant is always overlaid on the axis $X_0$. It passes through the center of ocular rotation R and through the apex of the eye's crystalline lens, denoted A. The elevation (or "declination") of the direction D is then the angle $\alpha$ which is measured in a vertical plane, the X-Z plane in the figure, between the reference direction $D_0$ and a perpendicular projection $D_1$ of the direction of gaze D onto the X-Z plane. By convention, the elevation $\alpha$ is reckoned positively for a direction of gaze which is oriented downwards, that is to say below the X-Y plane. The azimuth of the direction of gaze D through the lens 1 is the angle β between this direction D and the vertical X-Z plane, that is to say between the direction D and its projection $D_1$. By convention, the azimuth β is reckoned positively when the direction D points toward the nasal side of the lens 1, with respect to the vertical X-Z plane.

Moreover, the optical characteristics of the spectacle lenses which are given hereinafter have been obtained by adopting, for all the necessary calculation and measurement parameters, values usually used by the person skilled in the art. Such optical characteristics comprise, in particular, values of optical power P and of astigmatism, and the parameters which are fixed may be the wearer's lens wearing parameters, physiological parameters of the wearer, etc. Throughout the present description, the optical characteristics which are considered pertain to foveal vision.

Thus a spectacle lens may be described by the supply of charts of optical power and astigmatism. Such charts indicate respective values of the optical power and of the astigmatism, expressed in diopters, for each pair of values of the elevation α and azimuth β.

Now, a spectacle lens is always associated with an ophthalmic prescription, and it is allocated to an identified wearer when this wearer's visual defect corresponds to the prescription of the lens. The prescription of the lens comprises a value of optical power, denoted WP, which is produced for a reference direction through the lens, for example the direction $D_0$. It also comprises an astigmatism value, denoted WA. The residual astigmatism is then introduced, which is denoted A, and which is the difference between the real value of astigmatism of the spectacle lens for a given direction of gaze, and the prescribed value of astigmatism WA. In a general manner, the values of the optical power P and of the residual astigmatism A vary between different directions of gaze labeled by the elevation α and the azimuth β.

For each direction of gaze D, the spectacle lens produces, by itself, image blur whose value B may be calculated according to several alternative formulae, known to the person skilled in the art. For example, the value of the blur B may be calculated using the following formula:

$$B = |WP-P| + |A|/2^{1/2}. \quad (1)$$

where |~| designates the absolute value. Thus, the blur value B depends in general on the elevation α and on the azimuth β of the direction of gaze D through the spectacle lens.

When the ocular accommodation is sufficient to compensate for the optical power defect WP−P, the previous formula may be reduced to:

$$B|A|/2^{1/2}. \quad (2)$$

The ophthalmic spectacle lens which is allocated to an identified wearer by using the invention may be of an arbitrary type. Generally, the series of spectacle lenses which is used in a method according to the invention comprises at least one lens for different prescriptions.

In particular, this may be a series of lenses with progressive addition of optical power, commonly called progressive lenses. In this case, the ophthalmic prescription which is associated with each lens furthermore comprises an addition value, which is the difference in optical power of the lens between a direction of near vision and a direction of far vision through the lens. The lenses of the series therefore correspond to variable addition values, for example separated by 0.25 diopter between two successive addition values. They may correspond moreover to variable values of mean and cylinder curvature of the front face for the direction of far vision. Optionally, they may also correspond to variable designs for each prescription.

Alternatively, the lens which is allocated to a wearer according to the invention may be a monofocal lens which carries out at one and the same time a correction of the wearer's foveal vision and a correction of his peripheral vision. In the latter case, the lenses of the series used for the invention are all monofocal and correspond to different prescribed values of optical power and of astigmatism. Optionally, the series may also comprise lenses which correspond to variable peripheral corrections for one and the same foveal correction of a prescription.

According to equivalent modes of implementation of the invention, the spectacle lenses of the series used may be real lenses, for example semi-finished or finished lenses, or else lenses which are listed in a catalog, for example in the form of digital files recorded in a library and each containing a description of a lens. In the latter case, the invention may be implemented by computer and the lens which is allocated to the wearer is produced on the basis of the result of the computer processing.

At least one reference value of the elevation α of the direction of gaze D, for which the lens will be suited to the perception of the blur by the future wearer, is then fixed. A transverse distribution of the values B of the blur which is produced by each lens of the series is then determined for this elevation value, denoted $α_0$. This distribution is described by the variations of the function $B(α_0, β)$ for each lens, when the elevation α is constantly equal to the reference value $α_0$ and the azimuth β varies. When other additional elevation values $α_1, α_2, \ldots$ are taken into account as extra references, as many transverse distributions of blur $B(α_1, β), B(α_2, β), \ldots$ are obtained initially moreover for each lens of the series used.

According to a first preferred choice of the elevation reference value $α_0$, the latter may be fixed between 20° and 45°, preferably between 26° and 38°, below the direction of gaze D which passes through the fitting cross FC of each lens, corresponding to the direction $D_0$. Such a value for $α_0$ is particularly suitable for providing progressive lenses to several wearers so that they all have the sensation of benefiting from a near vision zone having one and the same width.

According to a second preferred choice of the elevation reference value $α_0$, the latter may be fixed between −10° and +2° with respect to the direction $D_0$. A different value for $α_0$ such as this is particularly suitable for providing progressive lenses to several wearers so that they all have the sensation of benefiting from an intermediate or far vision zone having one and the same width. It is also suitable for monofocal lenses which correct at one and the same time foveal vision and peripheral vision.

When several reference values are used simultaneously for the elevation, a first of these values, for example $α_0$, may be fixed between 20° and 45°, preferably between 26° and 38°, and a second of these reference values, $α_1$, may be fixed between −10° and +2°.

A reference threshold value for the blur, which is denoted $B_R$ hereinafter, is furthermore fixed. The value $B_R$ determines a limit below which the blur B may be deemed to be hardly perceptible, or hardly an inconvenience, by a majority of individuals. This limit depends on the criterion or on the test for evaluating the visual perception of the blur which is used. Accordingly, several tests of blur perception may be used alternatively, which are known to the person skilled in the art and are therefore not restated in detail here. The reference threshold value of the blur $B_R$ may be an average of threshold values of the perceived blur which are obtained respectively for individuals of a population sample. In this case, the method of the invention may furthermore comprise a prior step of updating the reference threshold value of the blur $B_R$, on the basis of a new population sample which is increased with respect to an earlier population sample on the basis of which a reference threshold value of the blur was previously established. Alternatively, the reference threshold value of the blur $B_R$ may be borrowed from studies whose results have been published.

When it is fed into the transverse distribution of the blur $B(\alpha_0, \beta)$ of a lens, the reference threshold value of the blur $B_R$ defines, for the elevation value $\alpha_0$, the width of a band in the lens, through which a majority of individuals corresponding to the prescription of this lens would have an impression of sharp vision. When several elevation reference values $\alpha_0, \alpha_1, \alpha_2, \ldots$ are considered simultaneously, and when the value $B_R$ is fed into the transverse distributions of the blur $B(\alpha_0, \beta)$, $B(\alpha_1, \beta)$, $B(\alpha_2, \beta)$, $\ldots$, a width profile of a vertical channel of sharp vision through each lens is defined, corresponding to a sharpness of vision assessed by a majority of individuals.

In addition to his ophthalmic prescription, at least one threshold value $B_0$ of the blur which is perceived by the future wearer of the lens is then determined for him. When several elevation reference values are used, a threshold value of the blur which is perceived by the wearer may be determined for each of the elevation reference values. They are designated by $B_0, B_1, B_2, \ldots$ and are respectively associated with $\alpha_0, \alpha_1, \alpha_2, \ldots$. Such threshold values of the blur perceived by the wearer may be obtained by performing, with the latter, tests of visual perception that are identical to those already mentioned for the reference threshold value $B_R$. Alternatively, each perceived-blur threshold value which is obtained for the wearer may be deduced from a psychological analysis which is carried out for him, and/or from a morphological analysis which is carried out with the aid of his face. It will be possible to refer in this regard to the available articles which relate to relationships established between certain psychological traits of an individual and his visual perception of blur. In particular, it is recognized that an individual who exhibits the typical psychological traits of introversion, especially lack of self-confidence, also manifests a greater tolerance to blur than extrovert individuals. Likewise, morphopsychology studies have established a correlation between certain characteristics of an individual's face and relevant psychological characteristics of this individual.

In simplified implementations of the invention, all the threshold values $B_0, B_1, B_2, \ldots$ which are associated respectively with the elevation reference values $\alpha_0, \alpha_1, \alpha_2, \ldots$ may be taken equal to one and the same threshold value of the blur which is perceived by the wearer.

A first spectacle lens is then selected from among the series, which corresponds to the wearer's ophthalmic prescription. When the series of lenses comprises only a single lens for each prescription, this lens is selected as first lens, and the lens which will ultimately be allocated to the wearer, called the second lens, will be obtained by modifying the first lens appropriately, as described further on.

When the series of spectacle lenses comprises several lenses for one and the same prescription, one of them is selected as first lens, optionally by using an additional selection criterion. For example, a series of progressive lenses may comprise, for each ophthalmic prescription, several designs which correspond to different behaviors of wearers when each of the latter looks successively at objects which are situated in different directions. These variations in behavior can correspond in particular to variable coordination between rotational movements of the eyes and rotational movements of the head which are performed simultaneously by each wearer. Such series of lenses, whose designs vary as a function of the coordination of the wearers' eye and head movements, in addition to their ophthalmic prescriptions, are well known to the person skilled in the art. In this case, the first lens may be selected as a function of the wearer's ophthalmic prescription and of a result of an eye-head coordination measurement which has been performed for him. The invention then introduces a change in the lens which is ultimately provided to the wearer, with respect to the selection which would result only from the ophthalmic prescription and from the determination of the coordination of the wearer's eye and head movements. In addition to this coordination of the movements of the eyes and head, the lens provided takes account of the wearer's sensitivity to blur. In this way, the spectacle lens which is provided to each wearer is suited at one and the same time to his coordination of eye and head movements and to his individual perception of blur.

Figure 2:
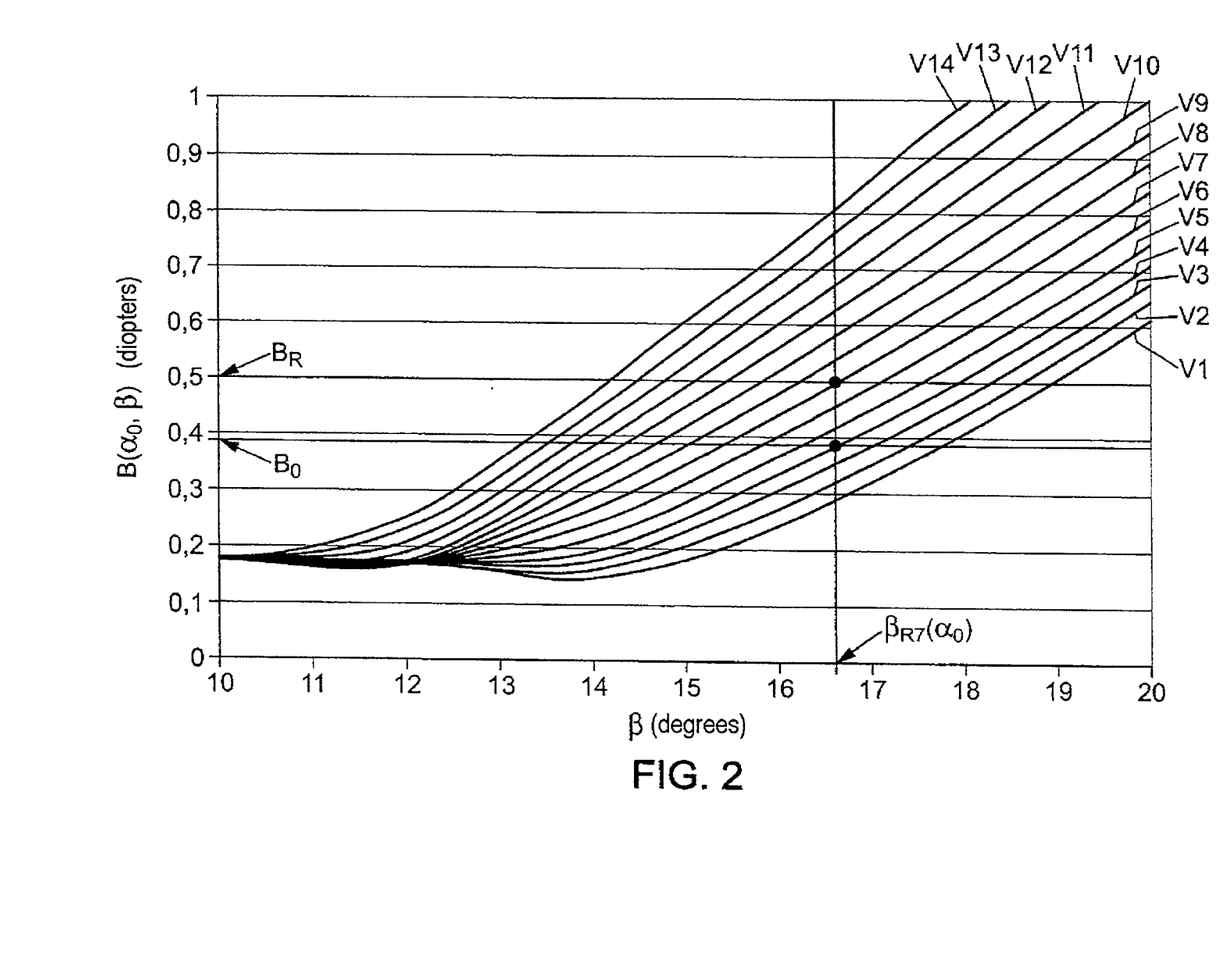
FIG. 2 is a diagram which illustrates the transverse distributions of blur for different lenses corresponding to one and the same ophthalmic prescription.

The detailed description of the invention is continued firstly when a single elevation reference value $\alpha_0$ is taken into account, with reference to FIG. 2. This figure is a diagram which represents the transverse distributions of the blur $B(\alpha_0, \beta)$ of several lenses of the series which correspond to the wearer's prescription, for example fourteen lenses identified by $V_1, \ldots, V_{14}$. The horizontal axis of the diagram labels the azimuth values $\beta$ expressed in degrees, and the vertical axis labels the values of the blur of each lens of the series, which are calculated for example according to formula (1) given above. The first lens which is selected may be the lens $V_7$, for example, by taking into account the coordination of the wearer's eye and head movements.

The reference threshold value of the blur $B_R$, equal to 0.50 diopter by way of example, is then plotted on the vertical axis of the diagram. The distribution curve for the lens $V_7$ then indicates an azimuth value denoted $\beta_{R7}(\alpha_0)$ for which the blur $B$ of the lens $V_7$ is equal to the reference value $B_R$. On the diagram, the azimuth value $\beta_{R7}(\alpha_0)$ is equal to about 16.6° (degrees).

The diagram of FIG. 2 is then searched to find that one of the lenses $V_1, \ldots, V_{14}$ which possesses the threshold value $B_0$ of the blur perceived by the wearer for the azimuth value $\beta_{R7}(\alpha_0)$. By way of example, $B_0$ is assumed equal to 0.39 diopter for the wearer. The lens $V_4$ is thus selected as second lens and allocated to the wearer. Although this second lens exhibits only a blur $B$ of 0.39 diopter for the azimuth value of 16.6°, it affords its wearer a subjective width of the field of sharp vision which is identical to that of the lens $V_7$ for an average wearer.

In this implementation, the invention introduces a modification of that one of the lenses $V_1, \ldots, V_{14}$ which is allocated to the wearer, with respect to the first lens which has been selected possibly as a function of the coordination of the wearer's eye and head movements. This modification makes it possible to take account of the perception of the blur which is specific to each wearer. It therefore entails a novel use of the initial series of spectacle lenses, which does not require these lenses to be modified.

Generally, the second lens which is selected may not exhibit exactly the blur value $B_0$ for the azimuth value $\beta_{R7}(\alpha_0)$. It suffices that the second lens selected exhibit, for the azimuth value $\beta_{R7}(\alpha_0)$, a discrepancy which is less than 0.50 diopter in absolute value, preferably less than 0.25 diopter, so that this second lens is suited to the wearer's perception of blur.

In a variant of the implementation of the invention which has just been described, the series of ophthalmic spectacle lenses which is used may be a set of lenses indexed by at least one parameter. Such is the case, for example, when the lenses have a surface with a shape defined by an equation which comprises at least one variable parameter. The values of this parameter may vary in a discrete or continuous manner between two different lenses of the series, and constitute an indexation for them. The selecting of an arbitrary lens of the series then consists in the selecting of a value of the indexation parameter.

When the series of spectacle lenses which is used comprises only a single lens for the wearer's ophthalmic prescription, the second lens cannot be determined as has just been described on the basis of the diagram of FIG. 2. The second lens which is ultimately allocated to the wearer may be calculated on the basis of the first lens $V_7$, by optimization by imposing as constraint that the first and the second lens have prescriptions which are identical, and that the second lens exhibits the value $B_0$ for the blur B, for the respective values $\alpha_0$ and $\beta_{R7}(\alpha_0)$ of elevation and of azimuth. The principle of such optimization calculation is commonplace, and assumed to be known to the person skilled in the art.

The implementation of a refinement of the invention is now described, which makes it possible to take into account the wearer's sensitivity to visual blur simultaneously for several different elevations of his gaze. This refinement is particularly suitable for the production of a customized progressive lens, since the wearer's sensitivity to blur can vary as a function of the observation distance, that is to say of the remoteness of the objects that he is looking at. In this case, it is particularly advantageous that at least one of the elevation reference values be contained in an interval of elevation values which corresponds to a zone of near vision or to a zone of far vision of at least one spectacle lens of the series used.

The steps of the method which were described previously for the elevation reference value $\alpha_0$ are repeated for other elevation reference values $\alpha_1, \alpha_2, \ldots$. Accordingly, diagrams similar to that of FIG. 2 are also available respectively for these other elevation reference values. Each iteration then leads to a lens of the series, which exhibits the threshold value of the blur perceived by the wearer for the corresponding elevation reference value and for a value of the azimuth $\beta$ adjusted for this wearer. Thus, a lens designated by V(0) exhibits the threshold value $B_0$ of the blur perceived by the wearer for the elevation reference value $\alpha_0$ and the azimuth value $\beta_{RV(0)}(\alpha_0)$, a lens V(1) exhibits the threshold value $B_1$ of the blur perceived by the wearer for the elevation reference value $\alpha_1$ and the azimuth value $\beta_{RV(1)}(\alpha_1)$, .... The second lens V, to be allocated to the wearer, may then be determined in the form of a linear combination of the lenses V(0), V(1), ...:

$$V = \frac{1}{n}\sum_{i=0}^{n-1} a_i \cdot V(i)$$

where the linear combination of the lenses V(i) may be a linear combination of respective sagittal heights of the latter, corresponding to identical values of elevation $\alpha$ and of azimuth $\beta$, i is an index for numbering the elevation reference values which are considered and n is the number of these elevation reference values. $a_i$ are then the coefficients of the linear combination, which depend on the elevation $\alpha$ and on the azimuth $\beta$. They may be determined by optimization of optical characteristics of the lens, while furthermore supplementing the optimization with the constraint according to which the optimized lens V and each lens V(i) have substantially the same value of the blur B for the elevation $\alpha_i$ and the azimuth $\beta_{RV(i)}(\alpha_1)$, to within less than 0.50 diopter.

Generally, and as was described above in a particular case in conjunction with FIG. 2, the second lens may be selected from among the lenses of the initial series. Accordingly, this series must comprise several lenses for each prescription, which correspond to variable distributions of the values of the blur as a function of azimuth, for each reference value of the elevation.

Alternatively, and as was illustrated afterwards, the second lens may be selected by performing a numerical optimization on the basis of the first lens selected. In this case, each perceived-blur threshold value which is obtained for the wearer may be introduced into the optimization as blur target value for the corresponding elevation reference value and for the azimuth value which corresponds to this elevation reference value and to the blur reference threshold value.

Ultimately, the lens which is intended for the wearer is produced in accordance with the second lens selected. The latter step may be executed in various ways as a function of the mode of implementation of the invention. For example, when the series of lenses which is used is a series of real semi-finished lenses, the lens which is ultimately allocated to the wearer is produced by machining a face of the second semi-finished lens selected, so as to produce the wearer's ophthalmic prescription. Alternatively, when the lenses of the series are defined by digital files, the lens which is allocated to the wearer may be obtained by machining the two faces, front and back, of a lens blank, in accordance with the second lens which has been calculated.

It is understood that the present invention may be implemented by introducing certain modifications or adaptations with respect to the description thereof which has been given. In particular, the order of execution of some of steps /1/ to /7/ may be modified, on condition that the data and the measurement results which are necessary for executing each step are actually available at the time when this step is executed.

The invention claimed is:

1. A method for producing an ophthalmic spectacle lens for an identified wearer, and customized as a function of a perception of blur by said wearer, comprising the following steps:

/1/ obtaining characteristics of a set of spectacle lenses corresponding to variable ophthalmic prescriptions and, for each prescription, to at least one distribution of blur values as a function of values of an azimuth of direction of gaze, for a fixed elevation reference value of an elevation of the direction of gaze;

/2/ obtaining a reference threshold value of the blur;

/3/ for the identified wearer, obtaining an ophthalmic prescription and at least one threshold value of the blur perceived by said wearer;

/4/ from the set of spectacle lenses used in step /1/, selecting a first lens corresponding to the wearer's ophthalmic prescription;

/5/ for said first lens and for the elevation reference value, determining an azimuth value of the direction of gaze for which the first lens has the reference threshold value of the blur;

/6/ selecting, from the set of spectacle lens, a second lens corresponding also to the wearer's ophthalmic prescription, and the value of blur of said second lens for the elevation reference value and for the azimuth value determined in step /5/ exhibits a discrepancy of equal to or less than 0.50 diopter in absolute value with respect to the perceived-blur threshold value obtained for the wearer in step /3/; and /7/ producing the lens for the wearer in accordance with the second lens selected in step /6/.

2. The method as claimed in claim 1, according to which the discrepancy between, on the one hand the value of the blur of the second lens selected in step /6/, for the elevation reference value and for the azimuth value determined in step /5/, and on the other hand the perceived-blur threshold value obtained for the wearer in step /3/, is equal to or less than 0.25 diopter in absolute value.

3. The method as claimed in claim 1, according to which the blur reference threshold value obtained in step /2/ is an average of perceived-blur threshold values which are obtained respectively for individuals of a population sample.

4. The method as claimed in claim 3, furthermore comprising a step of updating the reference threshold value of the blur, on the basis of a new population sample increased with respect to an earlier population sample on the basis of which a reference threshold value of the blur has been previously established.

5. The method as claimed in claim 1, according to which the value of the blur for an arbitrary lens, for a pair of values of elevation and of azimuth of the direction of gaze, is calculated according to the formula:

$$B = |WP - P| + |A|/2^{1/2}$$

where:
- B is the value of the blur;
- WP is an optical power value of the ophthalmic prescription corresponding to said lens and to the value of elevation of the direction of gaze; and
- P and A are respective values of optical power and of residual astigmatism of said lens for said pair of elevation and azimuth values.

6. The method as claimed in claim 1, according to which the elevation reference value is fixed between 20° and 45° below a direction of gaze passing through a fitting cross of each lens.

7. The method as claimed in claim 1, according to which the elevation reference value is fixed between −10° and +2° with respect to a direction of gaze passing through a fitting cross of each lens, said elevation values being positive and negative for directions of gaze passing below and above the fitting cross, respectively.

8. The method as claimed in claim 1, according to which:
- in step /1/: distributions of values of the blur as a function of the azimuth values are obtained for each lens of the set and for several fixed reference values for the elevation of the direction of gaze;
- in step /3/: a threshold value of the blur perceived by the identified wearer is obtained for each elevation reference value;
- step /5/ is repeated with the same first lens for each elevation reference value, so as to determine an azimuth value associated with each elevation reference value and for which the first lens has the reference threshold value of the blur for said elevation reference threshold value; and
- step /6/ is carried out so that the second lens has values of the blur, for all the elevation reference values used in step /1/ and associated respectively with the corresponding azimuth values determined during the iterations of step /5/, which each exhibit a discrepancy of less than or equal to 0.50 diopter in absolute value with respect to the perceived-blur threshold value obtained in step /3/ for the wearer and for the corresponding elevation reference value.

9. The method as claimed in claim 8, according to which a first elevation reference value is fixed between 20° and 45° below a direction of gaze passing through a fitting cross of each lens, and a second elevation reference value is fixed between −10° and +2° with respect to the direction of gaze passing through the fitting cross of each lens, said elevation values being positive and negative for directions of gaze passing below and above the fitting cross, respectively.

10. The method as claimed in claim 1, according to which the lenses of the set used in step /1/ are progressive.

11. The method as claimed in claim 10, according to which at least one elevation reference value used in step /1/ is contained in an interval of elevation values corresponding to a near vision zone or to a far vision zone of at least one lens of the set used in said step /1/.

12. The method as claimed in claim 1, according to which the lenses of the set used in step /1/ are monofocal.

13. The method as claimed in claim 1, wherein:
- the set of spectacle lenses used in step /1/ comprises for each prescription several lenses corresponding to variable distributions of the values of the blur as a function of the values of the azimuth of the direction of gaze, for each reference value of the elevation of said direction of gaze; and
- the second lens is selected in step /6/ from said set of spectacle lenses.

14. The method as claimed in claim 1, according to which the second lens is selected in step /6/ by performing a numerical optimization on the basis of the first lens selected in step /4/, and by introducing into said optimization each perceived-blur threshold value obtained for the wearer during an execution of step /3/ as the target value of the blur for the corresponding elevation reference value and for the corresponding azimuth value determined during an execution of step /5/.

15. The method as claimed in claim 1, according to which the first lens is selected in step /4/ as a function of the wearer's ophthalmic prescription and of a result of an eye-head coordination measurement performed for said wearer.

16. The method as claimed in claim 1, according to which each perceived-blur threshold value obtained for the wearer in step /3/ is deduced from a psychological analysis carried out for said wearer, and/or from a morphological analysis carried out with the aid of said wearer's face.

* * * * *

UNITED STATES PATENT AND TRADEMARK OFFICE
CERTIFICATE OF CORRECTION

PATENT NO.          : 8,573,778 B2                                             Page 1 of 1
APPLICATION NO.     : 13/264146
DATED               : November 5, 2013
INVENTOR(S)         : Björn Drobe et al.

It is certified that error appears in the above-identified patent and that said Letters Patent is hereby corrected as shown below:

In the Specification

Column 5, Line 42,
"$B=|WP-P|+|A|/2½$" should read as, --$B=|WP-P|+|A|/2^{½}$--.

Column 5, line 44,
"where |~| designates the absolute value. Thus, the blur" should read as, --where |.| designates the absolute value. Thus, the blur--.

Column 5, line 52,
"$B=|A|/2½$" should read as, --$B=|A|/2^{½}$--.

In the Claims

Column 11, Line 24,
"$B=|WP-P|+|A|/2½$" should read as, --$B=|WP-P|+|A|/2^{½}$--.

Signed and Sealed this
Twentieth Day of May, 2014

Michelle K. Lee
*Deputy Director of the United States Patent and Trademark Office*